Dec. 16, 1947.     A. E. KING     2,432,575
LAMINATING PROCESS
Filed Feb. 10, 1944
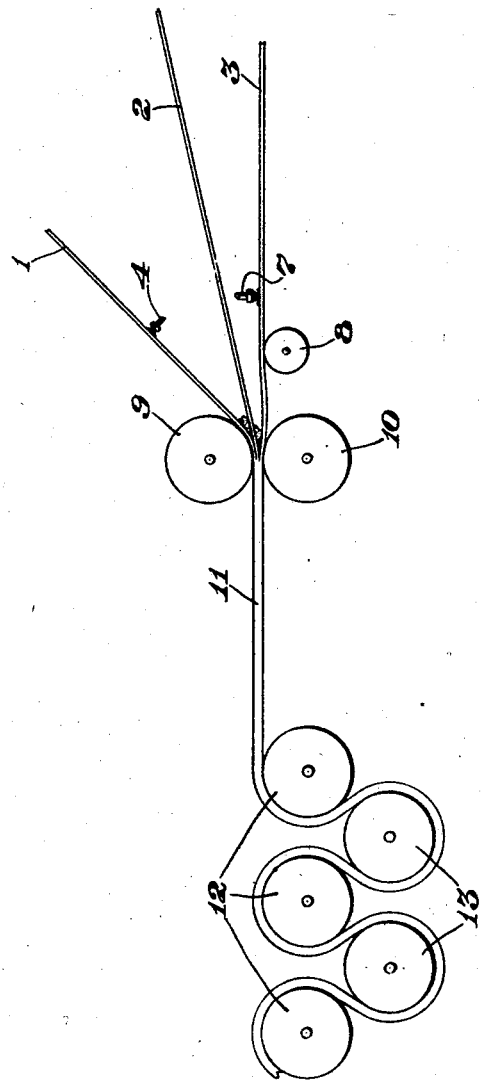
*Arthur Edward King,* INVENTOR.
BY
ATTORNEY Patented Dec. 16, 1947

2,432,575

UNITED STATES PATENT OFFICE 2,432,575

LAMINATING PROCESS

Arthur Edward King, Bridgwater, England, assignor to E. I. du Pont de Nemours & Company, Wilmington, Del., a corporation of Delaware Application February 10, 1944, Serial No. 521,881
In Great Britain March 10, 1943

7 Claims. (Cl. 154—136)

This invention consists in improvements in or relating to the manufacture of laminated sheet material from layers or laminations of water-sensitive non-fibrous sheets or films.

By "water-sensitive non-fibrous sheets or films" is meant those sheets or films which are characterized in that they absorb water when they are brought into contact with water or water vapor, and in so doing they tend to change their dimensions.

While for convenience the invention will be described hereinafter with particular reference to regenerated cellulose sheets and films (which in the dry state are water-sensitive), since it is in respect of these sheets and films that the invention displays its greatest advantages, it is to be understood that the invention is also applicable in general to non-fibrous sheets and films which in the dry state are water-sensitive, including sheets and films cast from lowly substituted cellulose ethers such as glycol cellulose, methyl cellulose and ethyl cellulose, lowly substituted cellulose esters, such as lowly acetylated cellulose, and lowly substituted cellulose ether-esters, such as lowly acetylated lowly substituted ethyl cellulose, sheets and films cast from albuminous materials such as gelatin, and sheets and films cast from other water-sensitive non-fibrous film-forming materials, such as alginic materials. On the other hand, sheets and films of highly etherified cellulose and sheets and films of highly esterified cellulose, for example ordinary cellulose acetate containing about 54% acetyl, are not water-sensitive for the purpose of this invention.

In the usual commercial processes for the continuous manufacture of regenerated cellulose films, the films are subjected to tension which causes internal strains in the material thereof. The view is widely held that during the process of manufacture and drying of the films, certain of these internal strains become fixed in the material of the films.

When the water content of commercial regenerated cellulose film is increased, under constant conditions of moderate temperature and of low tension in the film, from its normal value of about 6% (reckoned on the combined weight of cellulose and glycerin or other softener in the dried film) to a higher value, such as 10%, the dimensions of the film increase, and when the water content of the film of increased water content is decreased from its higher value to its initial value, still under the constant conditions aforesaid, the dimensions of the film likewise regain substantially their initial value. When, however, the water content of commercial regenerated cellulose film is increased, under the constant conditions described, from its initial value, e. g. of about 6%, beyond a certain critical value, which in normal cases lies between about 15% and 20%, to a higher value, and is later decreased from this higher value to its initial value, the conditions of temperature and tension remaining constant, the film undergoes permanent shrinkage. The cause of this shrinkage is thought to lie in the release of internal strains that had been fixed in the material of the film during the process of manufacture and drying of the film. For a given sample of water-sensitive non-fibrous sheet or film, the magnitude of such shrinkage may vary according to the experimental conditions, from a value just above zero up to a maximum value; for a water-sensitive sheet or film constituted by a given non-fibrous material, the magnitude of such maximum permanent shrinkage varies with the make and batch of the sheet or film, and even for different parts of sheet or film of the same batch. For commercial regenerated cellulose film, such maximum permanent shrinkage amounts to about 3.5% to 4%.

It is known, in the production of laminated sheet materials, to allow regenerated cellulose sheets or films from which the laminated product is to be formed, to undergo permanent shrinkage (prior to the application thereto of aqueous adhesive), by wetting the sheets or films thoroughly with water, whereby the internal strains therein are thought to be released, and then to coat one or both of the wetted sheets or films on one side with a continuous thin layer of aqueous adhesive, and thereafter to laminate the said sheets or films, and finally to dry the laminated product.

Moreover, there is described in U. S. Patent No. 2,338,432, a process for the manufacture of laminated sheet material, which comprises coating a dry water-sensitive non-fibrous sheet or film on one side with a uniform and continuous thin layer of cold aqueous adhesive, and thereafter laminating the coated sheet or film to a second water-sensitive non-fibrous sheet or film within the period of imbibition of the first-mentioned sheet or film, the aqueous adhesive being used in a proportion insufficient to raise the total water content of the laminated product to a value equal to or above the critical value, whereby substantially no permanent shrinkage of the said sheets or films occurs at any stage of the said process, and then drying the laminated product.

Further, it has been proposed to face paper or textile material with moistureproofed regenerated cellulose film by a process of lamination in which a non-aqueous adhesive is employed, but the process has disadvantages, including those arising from the slow-drying properties of the adhesive, and is thus not altogether satisfactory.

One of the objects of the present invention is to provide a process for the lamination, with the aid of an aqueous adhesive, of water-sensitive non-fibrous sheets or films in such a manner that the resultant material will be free from distortion, such as by buckling, curling, creasing or wrinkling.

According to the present invention, a process for the manufacture of laminated sheet material from sheets or films of water-sensitive non-fibrous material, includes the step of securing, by means of an aqueous adhesive, an unsaturated sheet or film between two water-saturated sheets or films of the same or similar material.

More particularly, the present invention comprises a process for the manufacture of laminated sheet material, including the steps of coating, each on one side, two substantially water-saturated nonfibrous sheets which in the dry state are water-sensitive, and on both sides a water-sensitive non-fibrous sheet interposed between the two said sheets, continuously with a coating of aqueous adhesive, and thereafter laminating the coated sheets to form a laminated product, and drying the laminated product, in which the laminated product, at the moment of its formation, comprises alternate sheets of substantially water-saturated non-fibrous sheet and of water-sensitive non-fibrous sheet respectively, and is centro-symmetrical in respect of nature, thickness and water-content of the sheets, and the interposed water-sensitive sheet, after lamination, becomes saturated by absorption of water from the aqueous adhesive and from the water-saturated sheets and expands fully, and the adhesive is such that the setting time thereof is longer than the period of time required by the interposed sheet for full expansion on saturation.

It should be noted that in the above statement the words "sheet" and "sheets" are employed in the broad sense and are meant to include film, e. g., such as non-fibrous film commonly in use and generally designated as cellophane film or sheets.

The invention also includes laminated sheet material manufactured by the process in accordance with the invention.

The invention further includes a process as above described wherein coating of the two substantially water-saturated non-fibrous sheets each on one side, and of the interposed water-sensitive non-fibrous sheet on both sides, is effected progressively by passing them in contact with a supply of adhesive, and wherein lamination is effected progressively by leading the said coated sheets into contact and pressing them together progressively. This form of the invention may advantageously be carried out in a continuous manner by using long lengths of the sheets.

In one way of carrying out the invention reference being had to the accompanying drawing wherein the hereinafter described process of the invention is illustrated diagrammatically, two similar webs 1 and 3, of gel regenerated cellulose film are passed, one in a substantially horizontal path and the other above the former and making an angle of about 60° therewith, continuously and under moderate tension, together with an interposed web 2 of dry regenerated cellulose film, through a pair of nip-rollers, 9 and 10, under pressure. The two gel webs are each sprayed, on their inside surfaces respectively, continuously with aqueous adhesive from spray heads 4 and 7, and the amount of the aqueous adhesive so sprayed on in unit time is controlled so that a supply of adhesive, in the form of a wedge of from about 1 inch to 3 inches length of side, is formed between the gel webs at the nip of the nip-rollers, whereby the two gel webs are coated each on one side with a continuous layer of aqueous adhesive. The tensions of the webs are adjusted to such a value that the webs travel forward smoothly and without vibration, and the tension of the lower of the two gel webs is adjusted, relatively to that of the upper web, so that a shallow depression of the lower web is formed just in front of the nip, whereby the volume of the supply of adhesive contained in the wedge is increased. The interposed web of dry regenerated cellulose film is passed continuously through the wedge-shaped supply of adhesive, whereby it is coated on both sides with a continuous layer of the adhesive. The three coated webs are then laminated, within the time of imbibition of the interposed web, by passage together through the nip-rollers under laminating pressure to form a laminated product 11. The laminated product is then dried in such a way that the water-content thereof is reduced to the critical value, hereinafter defined, after the lapse of the time of imbibition of the interposed web, and drying is continued until the water-content of the laminated product is reduced to the desired value, for example to about 7% (reckoned on the oven-dry weight), preferably by passage of the laminated product in a state of moderate longitudinal tension over and in contact with rotating drying-rollers 12 and 13 which are heated to about 70°–80° C. Preferably, also the drying of the laminated product in such a way that the water-content is reduced to the critical value after the lapse of the time of imbibition of the interposed web is effected by adjusting the distance separating the line of nip of the nip-rollers from the line of first contact of the laminated product with the first heated drying-roller, or by controlling the speed of forward travel of the laminated product, or by controlling the drying conditions, such as the surface temperature of the drying rollers and the temperature and relative humidity of the atmosphere surrounding the drying rollers, or by a combination of two or more of these procedures. The laminated product, immediately after its formation, comprises alternate sheets of substantially water-saturated non-fibrous sheet and of water-sensitive non-fibrous sheet respectively and is centro-symmetrical in respect of nature, thickness and water-content of the sheets. The interposed web of dry regenerated cellulose film, on coating and laminating, absorbs water from the aqueous adhesive of the coatings and from the water absorbed in the gel webs, until it is substantially water-saturated, and as a result of such water-absorption by the interposed web, the latter expands. However, full expansion of the dry regenerated cellulose film as a result of water-absorption does not take place instantaneously, but normally takes place progressively during a short interval of time, for example 5 seconds. The aqueous adhesive employed is such that the setting time thereof, in the conditions described, is longer than the time required by the interposed sheet for full expansion on saturation; the unset adhesive acts as a lubricant for the relative movement of the expanding web. The laminated sheet material thus obtained is optically perfect, and is free from distortion such as by buckling, curling, creasing or wrinkling.

By way of a guide, it may be mentioned that for most water-sensitive non-fibrous sheet materials, the critical value is in the range of 15% to 20% by weight of water in the sheet, reckoned on the combined weight of sheet-base and softener in the dried sheet, but the critical value in any given case may be readily determined as will be apparent to those skilled in the art.

Approximate values of the times of imbibition of some of the commoner water-sensitive non-fibrous sheets or films, for an aqueous adhesive, containing about 5% dried adhesive, applied at a temperature of about 20° C. to the surface of the sheet or film, are shown, for guidance, in Table I below:

TABLE I

*Time of imbibition of the commoner water-sensitive non-fibrous sheets or films*

| | Seconds |
|---|---|
| Regenerated cellulose sheets, plain transparent, grade 300 (0.0009" thick) | 1.5 to 2 |
| Regenerated cellulose sheets, plain transparent, grade 600 (0.0016" thick) | 2 to 3 |
| Gelatin sheets, cast, 0.004" thick | Longer than 3 |
| Alginic material sheets, 0.001" thick | 1 to 1.5 |

The time of imbibition of a water-sensitive non-fibrous sheet or film in any given case may be determined, however, by reference to the method of such determination described hereinafter.

The aqueous adhesive for employment in the process in accordance with the invention should be sufficiently fluid to flow readily and to spread rapidly over the sheet or film to which it is applied, and should set slowly in the conditions prevailing after its application to the sheets and films. The aqueous adhesive employed is such that the setting-time thereof, in the conditions prevailing after its application, is longer than the time required by the interposed sheet for full expansion on saturation, whereby the said sheet is enabled to expand fully in the conditions described above. In practice, the setting time of the aqueous adhesive, in the conditions prevailing after its application, may normally extend with advantage to a period of from about 5 seconds upwards. If desired, the adhesive may be applied warm to the sheets or films, for example at a temperature of about 50° C., so as to increase its fluidity at the time of its application, but the time of imbibition of the interposed web will thereby reduced. If necessary or desirable, one or more substances having a softening action on the adhesive material, or on the sheet or film material to which the adhesive is to be applied, may be incorporated in the aqueous adhesive.

The preferred adhesive for employment in the process of the invention is an aqueous solution containing gelatin. In the preparation of the preferred adhesive, the gelatin may be dissolved in water heated to a temperature of about 75° C. For the gelatin, crude gelatin or light-colored hide glue may advantageously be used. If sheet gelatin or glue is used, it should be soaked overnight in a small amount of the water to be used; if powdered gelatin is employed, this preliminary soaking is unnecessary. After solution of the gelatin is complete, other ingredients, such as softeners, may be added, preferably in the form of a warm aqueous solution thereof. The solutions, of gelatin and of the other ingredients respectively, are well mixed by stirring and are then allowed to cool to the desired temperature, e. g., to about 50° C. for immediate use or to room temperature for storage. A few drops of clove oil, or of liquefied phenol, may be added, if desired, to the adhesive as a preservative.

The following examples show, by way of illustration, the composition of aqueous adhesives suitable for employment as adhesives in the process of the invention. Throughout the specification, the proportions are given in parts by weight unless otherwise indicated. Examples I and II are of aqueous gelatin adhesives.

EXAMPLE I

| | Parts |
|---|---|
| Gelatin | 2–10 |
| Water | 98–90 |

The proportions of the ingredients should be selected, within the ranges stated, so as to give a total of 100 parts.

EXAMPLE II

| | Parts |
|---|---|
| Gelatin | 3–10 |
| Glycerin | 2– 6 |
| Water | 95–84 |

The proportions of the ingredients should be selected, within the ranges stated, so as to give a total of 100 parts.

Adhesives comprising aqueous solutions or dispersions containing water-soluble sodium cellulose glycolates are also very satisfactory. The adhesives may be prepared by soaking low or medium viscosity types of water-soluble cellulose glycolate (sodium carboxy-methyl cellulose) containing approximately 0.4 mol of carboxy-methyl per glucose unit, in cold water overnight, and then stirring, until a uniform dispersion is obtained. A plasticizer, e. g., glycerin, for the cellulose derivative may be added to the dispersion. Examples of adhesives of this type are given in Examples III and IV.

EXAMPLE III

| | Parts |
|---|---|
| Low or medium viscosity type of water-soluble cellulose glycolate (sodium carboxy-methyl cellulose) containing approximately 0.4 mol of carboxy-methyl per glucose unit | 5–10 |
| Water | 95–90 |

The proportions of the ingredients should be selected, within the ranges stated, so as to give a total of 100 parts.

EXAMPLE IV

| | Parts |
|---|---|
| Low or medium viscosity type of water-soluble cellulose glycolate (sodium carboxy-methyl cellulose) containing approximately 0.4 mol of carboxy-methyl per glucose unit | 5–10 |
| Glycerin | 2.5–10 |
| Water | 92.5–80 |

The proportions of the ingredients should be selected, within the ranges stated, so as to give a total of 100 parts.

Adhesives comprising aqueous solutions or dispersions of artificial resins of the urea-formaldehyde type, present in the stage of partial polymerization, are also very satisfactory. An example of aqueous adhesives of this type is given in Example V.

Example V

The adhesive comprises an aqueous urea-formaldehyde syrup, present in an intermediate stage of polymerization and having a solids content of from 20% to 60%, and contains also 0.1% to 2% of ammonium chloride as a polymerization catalyst, the remainder being water. If desired, the ammonium chloride may be replaced, wholly or partially, by zinc chloride.

Aqueous adhesives other than those of the gelatin type, water-soluble cellulose derivative type, and urea-formaldehyde type, may be employed, if desired, as adhesives in the process of the invention, provided that they are compounded with due regard to the requirements set forth above. In general, however, the strength of joint obtained by the employment of such adhesives is inferior to that obtained with aqueous gelatin adhesives, but they may be used if desired in those cases where the greatest strength of joint is not essential. The following examples indicate, by way of illustration, the composition of further aqueous adhesives suitable for employment as adhesives in the process of the invention.

Example VI

The adhesive is constituted by an aqueous dextrin paste, consisting of:

| | Parts |
|---|---|
| Dextrin | 15 |
| Water | 85 |

Example VII

The adhesive is constituted by an aqueous solution containing gum arabic, and has the following composition:

| | Parts |
|---|---|
| Gum arabic | 10 |
| Glycerin | 5 |
| Water | 85 |

In preparing the adhesive, the powdered gum arabic is soaked overnight in a small quantity (about one-tenth of the whole) of water, then stirred until dissolved, and the dissolved gum arabic is diluted with the remainder of the water containing the glycerin in solution.

Example VIII

The adhesive is constituted by an aqueous solution of sodium silicate, the solution having a solids content of 10%.

Example IX

The adhesive is constituted by rubber latex preserved, in the known way, by the addition thereto of a small proportion of ammonia.

Example X

The adhesive is constituted by a known aqueous emulsion containing partially polymerized methyl methacrylate. The aqueous emulsion was prepared by diluting with water the aqueous methyl methacrylate emulsion to a concentration of 10% solids.

Example XI

The adhesive consists of an alkaline aqueous solution containing 10% to 30% of casein rendered soluble by the addition of borax, lime or soda ash, and containing, if desired, also a preservative. Such an adhesive may consist of:

| | Parts |
|---|---|
| Casein | 25 |
| Lime | 5 |
| Soda ash | 1 |
| Sodium fluoride | 2 |
| Water | 67 |

The sodium fluoride acts as a preservative.

The time of imbibition of a given water-sensitive non-fibrous sheet or film in respect of any of the adhesives mentioned above applied to the surface of the sheet or film at a moderate or low temperature is, of course, longer than that of the same sheet or film in respect of liquid water applied to the surface of the sheet or film in similar conditions.

Surface treatment, such as sizing, or water-sensitive non-fibrous sheets and films usually increases the time of imbibition thereof with respect to a given aqueous adhesive applied at a given moderate or low temperature. Thus, for example, in a case in which an aqueous gelatin adhesive was applied to a commercial sized regenerated cellulose film at 18° C., the time of imbibition was 70% longer than that in the case in which the same adhesive was applied to a similar but unsized film under like conditions. As an example of sized water-sensitive non-fibrous films, in respect of which the time of imbibition in respect of adhesives suitable for use in the process of the invention is longer than in respect of similar but unsized films under like conditions, mention may be made of films of regenerated cellulose prepared by the process described in the British Patent specification No. 386,775.

It is thus often advantageous that, in the carrying out of the process of the invention, the interposed water-sensitive non-fibrous sheet, employed initially dry, should have been subjected previously to a sizing treatment, whereby the time of imbibition thereof is increased. On the other hand, the two water-saturated non-fibrous sheets which are to be coated each on one side only may or may not, as desired, have been subjected previously to a sizing treatment.

After formation of the laminated product by lamination of the coated sheets, water passes progressively from the aqueous adhesive and from the water-saturated sheets to the interposed water-sensitive sheet until equilibrium is attained in respect of water content throughout the material of the laminated product. Thus, for example, in the manufacture of laminated sheet material by coating two gel regenerated cellulose sheets (A and C, each of grade 600 when dry), each on one side, and an interposed dry regenerated cellulose sheet (B, also of grade 600), on both sides, with a continuous layer of aqueous adhesive and thereafter laminating the coated sheets to form a laminated product, the water contents of the component sheets respectively at different stages of the process are shown in Table II below:

Table II

*Water content of the component regenerated cellulose sheets A, B and C*

| | Immediately prior to lamination | At the moment of lamination | Prior to drying and 2 seconds after lamination | Prior to drying and 10 seconds after lamination |
|---|---|---|---|---|
| | Per cent | Per cent | Per cent | Per cent |
| Sheet A | 300 | 300 | 290 | 202 |
| Sheet B | 6 | 6 | 26 | 202 |
| Sheet C | 300 | 300 | 290 | 202 |

So far the invention has been described with reference to the manufacture of laminated sheet material by laminating together three adhesively coated sheets to form a laminated product and drying the laminated product. The invention may also be applied, however, with advantage to the manufacture of laminated sheet material by laminating together an odd number greater than 3, such as 5 or 7, of adhesively coated sheets to form a laminated product, and drying the laminated product.

The invention accordingly includes a process for the manufacture of laminated sheet material as hereinbefore described, wherein the interposed water-sensitive sheet is replaced by an odd-numbered plurality of sheets arranged in sequence such that the sheets of odd number are water-sensitive and non-fibrous and the sheet or sheets of even number are water-saturated and non-fibrous.

The process of the invention is illustrated by the following examples which, however, in no way limit the scope thereof.

EXAMPLE XII

Two similar webs of glycerinated gel regenerated cellulose film, 54 inches in width and when dry of the grade known in the trade as 600 (thickness=0.00160"), were led over guide rollers and guide rods, and were passed, one in a substantially horizontal path and the other above the former and making a wide angle of about 60° therewith, continuously and under moderate tension, together with an interposed web of dry glycerinated regenerated cellulose film, 48 inches in width and of the grade known as 600, through a pair of rotating nip-rollers. The two gel webs were sprayed, on their inside surfaces respectively, continuously with aqueous adhesive, having the following composition:

| | Per cent |
|---|---|
| Gelatin | 10 |
| Water | 90 | which was applied to the surface of the two gel webs respectively at a temperature of 50° C. The amount of the aqueous adhesive so sprayed on in unit time was controlled so that a supply of adhesive, in the form of a wedge of about 2 inches length of side, was formed between the gel webs at the nip of the nip-rollers, any adhesive sprayed on in excess of requirements flowing from the edges of the lower web and being received in a conveniently placed receptacle therebeneath. The tensions of the webs were adjusted by trial to such values that the webs travelled forward smoothly and without vibration, and the tension of the lower of the two gel webs was adjusted, relatively to that of the upper gel web, so that a shallow depression of the lower web was formed just in front of the nip, whereby the volume of the supply of adhesive contained in the wedge was increased. The two gel webs were thus coated each on one side with a continuous layer of aqueous adhesive. The interposed web of dry regenerated cellulose film was led by guide rollers and guide rods to travel as a flat sheet symmetrically between the two gel webs, and was passed continuously through the wedge-shaped supply of adhesive, whereby it was coated on both sides with a continuous layer of the adhesive. The three webs were then laminated by passage together through the nip-rollers under laminating pressure, and the laminated product thus obtained was dried, by passage thereof in a state of moderate longitudinal tension over and in contact with rotating drying rolls heated to about 75° C., until the water content of the laminated product had been reduced to 7%, reckoned on the oven-dry weight. The time of imbibition of the dry regenerated cellulose web, in the conditions described, was about 2 seconds and the speed of travel of the webs was 15 meters per minute. At this speed, the web of dry regenerated cellulose was coated on both sides with a continuous layer of aqueous adhesive and the coated webs were thereafter laminated to form a laminated product in a period of time of about 0.20 second, and thus within the time of imbibition of the interposed web. The water content of the laminated product was reduced to the critical value in a time that exceeded 15 seconds, and was thus after the lapse of the time of imbibition of the interposed web. The setting time, in the conditions described, of the aqueous adhesive employed exceeded 30 seconds, and was longer than the time required by the interposed sheet for full expansion on saturation. The laminated sheet material, which was of the grade known in the trade as 1800, was optically perfect, and was free from distortion such as by buckling, curling, creasing and wrinkling.

EXAMPLE XIII

As in Example XII, except that the dry regenerated cellulose web was replaced by 6 colored dry regenerated cellulose webs, each 4.5 inches in width, arranged so as to be uniformly spaced across the width of the laminated product. The laminated sheet material, which was optically perfect and free from distortion, was useful as a decorative material.

EXAMPLE XIV

Two similar webs of glycerinated gel regenerated cellulose film, 7 inches in width and when dry of the grade known in the trade as 400 (thickness=0.0011"), were led, in the way described in Example XII, through a pair of rotating nip-rollers. The two gel webs were sprayed, on their inside surfaces respectively, continuously with aqueous adhesive having the following composition:

| | Parts |
|---|---|
| Gelatin | 5 |
| Water | 95 | and applied to the surface of the two gel webs respectively at a temperature of 35° C. Dry regenerated cellulose sheets, of grade 400 and measuring each 6 inches x 6 inches, were fed, one by one and with a small interval between successive sheets, by hand to the nip between the nip-rollers. The laminated product thus obtained was dried, by passage thereof in a state of moderate longitudinal tension over and in contact with rotating drying rollers heated to about 80° C. until the water content of the laminated product had been reduced to 6%, reckoned on the oven-dry weight. The time of imbibition of the dry regenerated cellulose web was about 1.5 seconds, and the speed of travel of the webs was 30 meters per minute. At this speed of travel, the sheets of dry regenerated cellulose were coated on both sides with a continuous layer of aqueous adhesive and the coated sheets and webs were thereafter laminated to form a laminated product in a period of time of about 0.1 second. The water content of the laminated product was reduced to the critical value in a period of time that exceeded 10 seconds. The setting-time, in the conditions described, of the aqueous adhesive employed exceeded 30 seconds, and the time required by the interposed sheets for full expansion on saturation was about 10 seconds. The laminated sheet material, which was of the grade known as 1200, was optically perfect and free from distortion.

Example XV

As in Example XIV, except that the webs of glycerinated gel regenerated cellulose film were, when dry, of the grade known in the trade as grade 300 (thickness=0.0009"), and that the dry regenerated cellulose sheets were replaced by small pieces of dry regenerated cellulose sheet, also of grade 300, cut into various geometrical designs and figures of persons, animals and objects, and of assorted colors, and that the pieces were strewn thinly but more or less uniformly by hand on to the surface of the lower coated gel web over the whole width of the web. The time of imbibition of the pieces of dry regenerated cellulose sheet was slightly longer than 1.5 seconds, and the speed of travel of the webs was 30 meters per minute. The pieces of dry sheet were coated with adhesive on the lower side by direct contact with the coating applied to the lower gel web, and on the upper side by passage through the wedge-shaped supply of adhesive provided at the nip between the nip-rollers, and the coated pieces and webs were thereafter laminated to form a laminated product within a period of about 0.75 second, reckoned from the instant of contact of the dry pieces of film with the aqueous adhesive on the lower gel web. The water content of the laminated product was reduced to the critical value in a period of time that exceeded 10 seconds. The setting-time, in the conditions described, of the aqueous adhesive employed exceeded 30 seconds, and the time required by the interposed pieces for full expansion on saturation was about 10 seconds. The laminated sheet material was optically perfect and free from distortion, and was useful as a decorative material.

Example XVI

As in Example XV, except that the small pieces of dry regenerated cellulose sheet, instead of having been strewn by hand, were scattered on to the surface of the lower coated gel web by means of a distributor as described in the British Patent specification No. 435,634.

The "critical value" of water-content of the film referred to herein is that value of water-content at which the internal strains, that were previously fixed in the material, are released; on drying again from water-contents at or above this critical value, the change of dimensions referred to above as permanent shrinkage takes place, where as in drying from contents below this value permanent shrinkage is absent. In most instances the critical value will fall within the range of 15% to 20% by weight of water reckoned on the combined weight of film base and softener in the dried film.

When water, in the form of liquid or vapor, is brought into contact with a water-sensitive non-fibrous sheet or film equilibrium in respect of water-content is not reached instantaneously by the sheet or film, but only after a finite time, which is referred to in this specification, with regard to liquid, as the "time of imbibition." The time of imbibition is determined, with respect to a given water-sensitive non-fibrous sheet or film, a given aqueous adhesive, and given conditions, by the method which will now be described: A sample, several feet in length, of the water-sensitive non-fibrous sheet or film to be tested is allowed to come to equilibrium at 24° C., with respect to water-content, in an atmosphere having a relative humidity of 35%, and while the sheet or film is so conditioned, two marks, about 12 inches apart along a line parallel to the machine direction of the sheet or film, i. e. the direction in the sheet or film in which the latter passed through the machine in which it was produced, are made on the sheet or film, with the aid of water-resistant material in the form of ink, paint or stain, and the distance between the marks, in the machine direction, is measured, the sheet or film being subjected to a tension amounting to about 2 ozs. per foot width of the sheet or film. The dry sheet or film is then coated on one side with a uniform and continuous, thin layer of the aqueous adhesive, and the so-coated non-fibrous sheet or film is laminated to a dry water-sensitive non-fibrous sheet or film of like nature, free from adhesive, by passage together therewith through a set of rotating nip-rollers under laminating pressure. The amount of adhesive per unit area of the coating applied as a uniform and continuous, thin layer to the sheet or film should be more than sufficient to raise the total water-content of the so-coated sheet or film to and beyond the critical value, but insufficient to bring the value of the total water-content of the laminated product up to the critical value. The laminated product, after its passage through the nip-rollers, is allowed to come to equilibrium at 24° F. with respect to water-content in an atmosphere having a relative humidity of 35%, and while the material is so conditioned and is subjected to the same tension as before, the distance between the two marks is again measured. If no substantial decrease (e. g. of the order of 0.1%) in the linear dimensions is found to have occurred between the initial and final measurement, then the interval of time that elapsed between the coating of the sheet or film with adhesive and the contact of the sheet or film, coated with adhesive, with the second sheet or film, by passage together therewith through the nip-rollers, is less than the time of imbibition. On the other hand, if a substantial contraction is observed to have taken place, due allowance being made for any wrinkles, creases or curling which may develop, then the time of imbibition has been exceeded. The test is repeated under like conditions, with fresh supplies of sheet or film and adhesive, for a series of different measured intervals of time between the coating of the sheet or film with adhesive and the contact of the sheet or film, coated with adhesive, with the adhesive-free sheet or film until two intervals of time, separated by a very short interval of about 0.5 second or less, are determined, in respect of one of which a contraction is observed and in respect of the other of which no substantial contraction is found to have occurred, and the arithmetic mean of the two intervals of time so characterized is taken as the time of imbibition.

One or both of the water-saturated non-fibrous sheets and/or the water-sensitive non-fibrous sheet for employment in the process in accordance with the invention may have been dyed, pigmented, or subjected to any special known treatment, e. g. with the object of increasing fire-proofness, or imperviousness to ultra-violet light.

Laminated sheet material manufactured by the process of the invention is suitable for use in cases where, for reasons such as a need for increased strength or rigidity, sheet material of thickness greater than that normally manufactured is desired. The process of the invention is economical and speedy.

I claim:

1. The process of laminating a plurality of water-sensitive non-fibrous sheets which comprises forming a multi-layer structure comprised of alternate sheets of water-wet and substantially dry non-fibrous, normally water-sensitive material each coated with a substantially continuous coating of aqueous adhesive the setting time of which is longer than the period of time required for full expansion on saturation of the dry sheets, the total water content of said sheets and adhesive coatings being above the predetermined critical value for said multi-layer structure; subjecting said structure to laminating pressure within the time of imbibition of the initially dry sheets thereof, and after said period of imbibition drying the resulting structure whereby to form a laminated structure free of distortions.

2. The process of laminating water-sensitive non-fibrous sheets which comprises coating, each on one side, two water-wet non-fibrous sheets which in the dry state are water-sensitive, and coating on both sides a substantially dry, water-sensitive, non-fibrous sheet, each with a substantially continuous layer of aqueous adhesive the setting time of which is longer than the period of time required for the full expansion on saturation of the last-named sheet, the total water-content of said sheets and adhesive coatings being above the predetermined critical value for the three sheets; interposing said last-named sheet between the first-named sheets and in contact with the coated surface of said first-named sheets, and thereafter applying laminating pressure to said sheets within the time of imbibition of the interposed sheet, and after said period of imbibition drying the resulting centro-symmetrical structure whereby to form a laminated structure free of distortions.

3. The process of laminating water-sensitive non-fibrous sheets which comprises coating, each on one side, two substantially water-saturated non-fibrous sheets which in the dry state are water-sensitive, and coating on both sides a substantially dry, water-sensitive, non-fibrous sheet, each with a substantially continuous layer of aqueous adhesive the setting time of which is longer than the period of time required for the full expansion on saturation of the last-named sheet, interposing said last-named sheet between the first-named sheets and in contact with the coated surface of said first-named sheets, and thereafter applying laminating pressure to said sheets within the time of imbibition of the interposed sheet, and after said period of imbibition drying the resulting centro-symmetrical structure whereby to form a laminated structure free of distortions.

4. The process of claim 1 wherein the water-sensitive non-fibrous sheets are of cellulosic material.

5. The process of claim 1 wherein the water-sensitive non-fibrous sheets are of regenerated cellulose.

6. The process of claim 2 wherein the water-sensitive non-fibrous sheets are of regenerated cellulose.

7. The process of claim 3 wherein the water-sensitive non-fibrous sheets are of regenerated cellulose.

ARTHUR EDWARD KING.

REFERENCES CITED

The following references are of record in the file of this patent:

UNITED STATES PATENTS

| Number | Name | Date |
| --- | --- | --- |
| 1,540,822 | Van Derhoef | June 9, 1925 |
| 2,273,677 | Wallach | Feb. 17, 1942 |
| 2,338,432 | Heaven | Jan. 4, 1944 |